US008904551B2

(12) United States Patent
Balasubramanyan et al.

(10) Patent No.: US 8,904,551 B2
(45) Date of Patent: Dec. 2, 2014

(54) CONTROL OF ACCESS TO FILES (71) Applicant: International Business Machines Corporation, Armonk, NY (US)

(72) Inventors: Arun Balasubramanyan, Chennai (IN); Mary E. Rudden, Denver, CO (US); Donald E. Schaefer, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 13/670,581

(22) Filed: Nov. 7, 2012

(65) Prior Publication Data
US 2014/0130180 A1 May 8, 2014

(51) Int. Cl.
*G06F 21/00* (2013.01)
(52) U.S. Cl.
USPC ............... 726/27; 726/2; 726/7; 713/150
(58) Field of Classification Search
CPC ................. G06F 2221/2141; H04L 63/101
USPC ............................................................. 726/27
See application file for complete search history.

(56) References Cited

U.S. PATENT DOCUMENTS

| 7,080,090 | B2 | 7/2006 | Shah et al. | |
| 7,167,859 | B2 | 1/2007 | Shah et al. | |
| 7,676,470 | B2 | 3/2010 | Arbajian | |
| 8,006,291 | B2 * | 8/2011 | Headley et al. | 726/7 |
| 8,555,403 | B1 * | 10/2013 | Kilday | 726/27 |
| 8,613,066 | B1 * | 12/2013 | Brezinski et al. | 726/7 |
| 8,635,664 | B2 * | 1/2014 | Yao et al. | 726/2 |
| 2009/0112967 | A1 * | 4/2009 | Amano et al. | 709/201 |
| 2009/0259838 | A1 * | 10/2009 | Lin | 713/150 |
| 2010/0011127 | A1 * | 1/2010 | Johnson et al. | 709/253 |
| 2010/0063903 | A1 * | 3/2010 | Whipple et al. | 705/30 |
| 2011/0087690 | A1 * | 4/2011 | Cairns | 707/769 |
| 2011/0307490 | A1 * | 12/2011 | Chow | 707/741 |
| 2012/0058775 | A1 * | 3/2012 | Dupray et al. | 455/456.1 |
| 2012/0089666 | A1 * | 4/2012 | Goswami et al. | 709/203 |
| 2012/0290954 | A1 * | 11/2012 | Qureshi et al. | 715/758 |

OTHER PUBLICATIONS

Fugkeaw, et al., A-COLD: Access Control of Web OLAP over Multi-Data Warehouse, 2009 International Conference on Availability, Reliability and Security, 978-0-7695-3564-7/09, DOI 10.1109/ARES.2009.71, pp. 469-474.

* cited by examiner

*Primary Examiner* — Kambiz Zand
*Assistant Examiner* — Yonas Bayou
(74) *Attorney, Agent, or Firm* — Schmeiser, Olsen & Watts, LLP; Mark C. Vallone (57) ABSTRACT

A method, system and program product for using access-control lists to control access to categorized computer files. Two or more computer files are each associated with one of a set of possible classifications that fall within a single category and an access-control list associates a user with a subset of these classifications. In response to the user's request for access to one of these files, where the request specifies the requested file but does not specify the category of the requested file, the processor identifies the requested file's category based on that file's associated classifications, checks the access-control list to determine that the user is authorized to access files of the identified category, and then grants the requesting user access to the requested file.

12 Claims, 4 Drawing Sheets

| User | GeoID |
|---|---|
| john.smith@hq_US.com | NA, SA, PR |
| mary.jones@hq_US.com | NA, SA |
| maria.vasquez@hq_VZ.com | SA |
| akira.hiro@hq_NP.com | NA, EU, PR |
| kim.soo@hq_KR.com | PR |
| kim.hyun@hq_KR.com | PR |
| harm.immel@hq_DE.com | NA, EU, PR |
| maria.parisi@hq_IT.com | EU |

117 —

| Filename | GeoID |
|---|---|
| S3000137a.doc | NA |
| S3000137E.pdf | NA, EU |
| S3000137x_fin_rev_0002.01.docx | SA |
| J401203970157_2014_pr_np.xlsx | NA, PR |
| J401203970157_2014_fin.docx | NA, PR |
| T132010003010_2015_wip.docx | PR |
| S3000137E_pr_final.docx | NA, EU |
| S3000137E_spec_final.docx | NA, EU |

TRANSACTIONS

| TicketID | GeoID | AuthL1 | AuthL2 | AuthL3 |
|---|---|---|---|---|
| TK121004 | 1 | 34 | 55 | 6 |
| TK121005 | 1 | 32 | 55 | 6 |
| TK121009 | 1 | 33 | 52 | 4 |
| TK121021 | 2 | 34 | 49 | 2 |
| TK123702 | 2 | 35 | 46 | 0 |
| TK123703 | 2 | 36 | 43 | -2 |
| TK123704 | 3 | 37 | 40 | -4 |
| TK123705 | 3 | 38 | 37 | -6 |
| TK123771 | 3 | 39 | 34 | -8 |
| TK121001 | 3 | 40 | 31 | -10 |
| TK121113 | 3 | 41 | 28 | -12 |
| TK121124 | 4 | 42 | 25 | -14 |
| TK121127 | 4 | 43 | 22 | -16 |

401

LOCATIONS

| GeoID | Region | Country | StPr | City |
|---|---|---|---|---|
| 1 | NA | US | NYS | NYC |
| 2 | NA | US | NYS | BUF |
| 3 | NA | Canada | QC | MTL |
| 4 | AP | Japan | NI | NRT |

403

USERS

| User | GeoID |
|---|---|
| J.Smith01@hq01.com | 1 |
| J.Smith17@hq01.com | 1 |
| R.Smith@hq01.com | 1 |
| Purch.Ag01@hq01.com | 2 |
| Purch.B@hq01.com | 2 |
| Purch.HQ@hq01.com | 2 |
| Purch.Mgr@hq01.com | 3 |

CONTROL OF ACCESS TO FILES

TECHNICAL FIELD

The present invention relates generally to computer systems, and more specifically to control of access to categorize files.

BACKGROUND

An access-control list ("ACL") is a well known security mechanism that comprises a list that can be used to limit access to data files and program files to one or more people listed in the ACL. For example, a user "John Smith" or a named program may be listed in an ACL, along with a named data file or a named program file, as being authorized to access the named data file or the named program file. If John Smith or the named program requests access to the file, the operating system checks the ACL to determine if John Smith or the named program is authorized to access the file.

While this type of ACL is secure, it must be updated every time a file is added to the system in order to add an entry in the ACL for the new file and to indicate which entities are authorized to access the new file.

BRIEF SUMMARY

Embodiments of the present invention comprise a method, system and program product for using access-control lists to control access to computer files. These embodiments receive and store classifications of two or more computer files, where those classifications fall within a single category. This category may, for example, identify products or product lines, geographic locations, customer account identifiers, network types, server platform types, or server operating statuses that may be associated with an access-controlled file.

This method, system, and program product further comprise receiving a configuration of an access-control list that grants one or more users access to the files based on the single category. In response to a requesting user's request for access to one of these files, where the request specifies the requested file but not the category of the requested file, one or more processors identify the requested file's category based on that file's stored classification, check the access-control list to determine that the user is authorized to access files of the identified category, and then grant the requesting user access to the requested file.

DETAILED DESCRIPTION

The present invention provides a method, computer system, and computer program product that implement a categorized ACL that secures data files and program files within a secured computer system.

An ACL may be used to secure a system that may comprise, but is not limited to, a computer system, all or part of a computer network, or other type of computing environment. An ACL may be one component of a security architecture that comprises other security mechanisms and rules.

In embodiments of the present invention, an ACL may be used in conjunction with a method of categorizing secured data files and secured program files. In such embodiments, the ACL may be configured to determine whether to grant a user access to a secured data file or a secured program file as a function of which categories are associated with the secure file.

In some embodiments, security procedures, data, and logic, including access-control lists and associated categories, may be organized into a security architecture stored in an information repository. Such an information repository may refer here to any collection of stored information and may be implemented as a set of databases, file systems, tables, data warehouses, or other data-storage platforms, using technologies well-known to those skilled in the art of computer-system design. Such implementations may take a wide variety of forms and, in some cases, stored categories may be further divided into subcategories.

In one example of how embodiments of the present invention might use an ACL-based authorization mechanism, a company might sell a set of products that are divided into "Product Line" categories. In such an embodiment, a secured computer system might store a set of secured data files, where each data file is related to one product of the set of products, and where each data file is assigned a Product Line category that is associated with a product related to that data file.

An embodiment of the present invention in this case might comprise an ACL that lists users and the categories of documents that each user is authorized to access. If a user requests access to a document, the security system will identify the category of the document, use the ACL to determine if the user is authorized to access documents in that category, and, depending on whether it determines that the user is so authorized, either grant or deny the user access to the requested document. Similar embodiments may be used to grant or deny users access to files based on categories that comprise, but are not limited to, geographic locations, customer-account identifiers, network types, server-platform types, and the operating status of a server.

Figure 1:
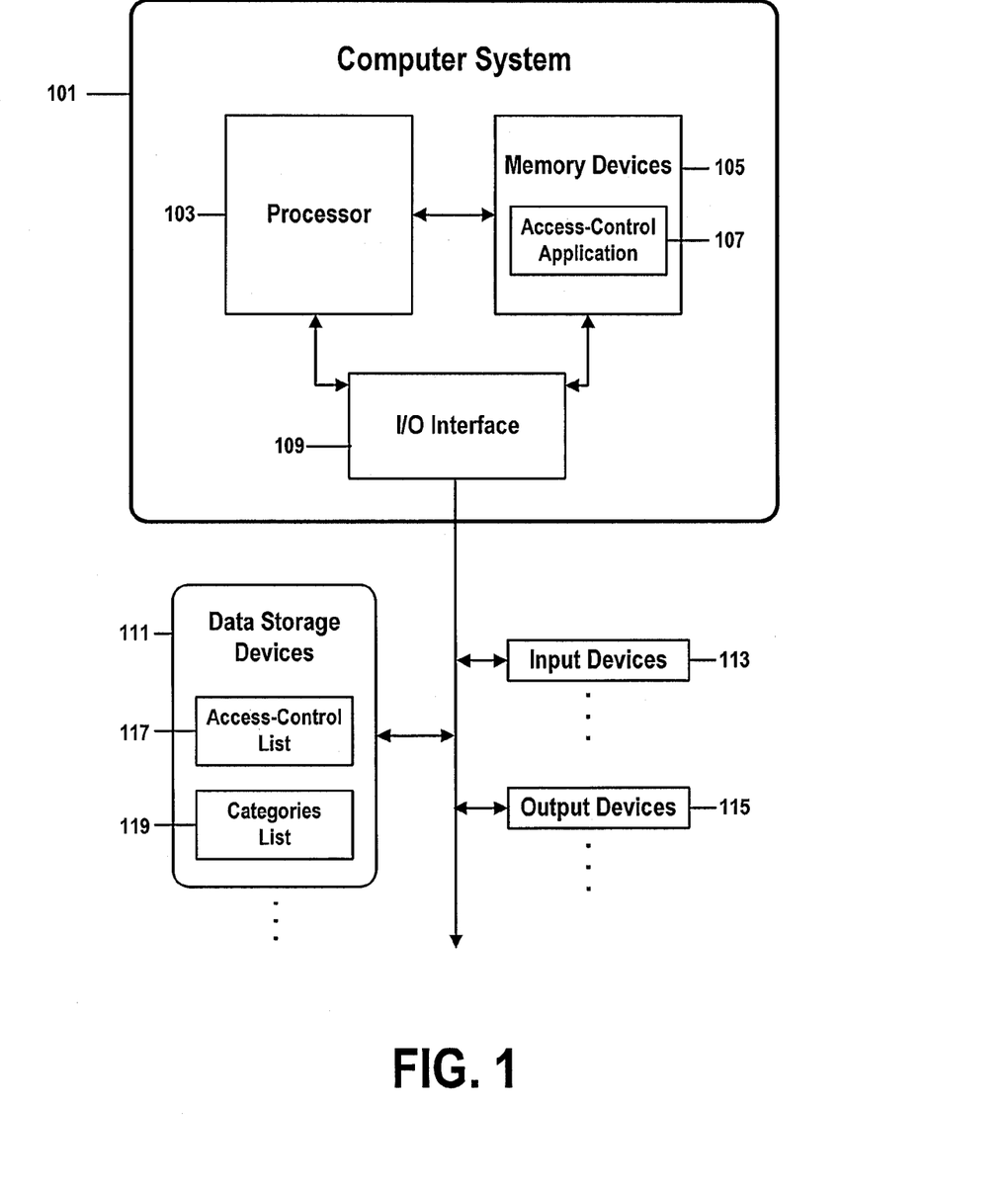
FIG. 1 is a block diagram of a computer system according to an embodiment of the present invention.

FIG. 1 is a block diagram of a computer system according to an embodiment of the present invention. FIG. 1 refers to objects 101-119.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, this program code configured to be executed by a processor of a computer system to implement the methods of the present invention. In embodiments of the present invention wherein physically tangible computer-readable medium(s) and/or device(s) (e.g., hardware media and/or devices) store the program code that implements methods of the present invention, this program code does not comprise a signal generally, or a transitory signal in particular.

Any combination of one or more computer-readable storage medium(s) or devices may be used. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: a portable computer diskette, a hard disk, a random access memory (RAM), a read-only memory (ROM), an erasable programmable read-only memory (EPROM or flash memory), a portable optical disc read-only memory (such as a CD-ROM or BD-ROM), an other optical storage device, a magnetic storage device, or any suitable combination of the foregoing. In the context of this document, a computer-readable storage medium may be any physically tangible medium or hardware device that can store a program for use by or in connection with an instruction execution system, apparatus, or device.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions that. Here, the stored computer program code comprises a security software application that implements a method for controlling access to files in accordance with embodiments of the present invention, and may implement other embodiments described in this specification, including the methods illustrated in FIGS. 1-4. The data storage devices 111 may store the stored computer code that comprises the security application 107 and may further store other components of embodiments of the present invention, such as access-control lists 117, lists of file classifications 119, or other components of a security architecture.

In some embodiments, data storage devices 111 may comprise an information repository that store other components of embodiments of the present invention, such as access-control lists 117, lists of file classifications 119, or other components of a security architecture. Computer program code 107 stored in the data storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for controlling access to computer files using an access-control list.

Any of the components of the present invention could be created, integrated, hosted, maintained, deployed, managed, serviced, supported, etc. by a service provider who offers to facilitate a method for controlling access to computer files using an access-control list. Thus the present invention discloses a process for deploying or integrating computing infrastructure, comprising integrating computer-readable code into the computer system 101, wherein the code in combination with the computer system 101 is capable of performing a method for controlling access to computer files using an access-control list.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

Figure 2:
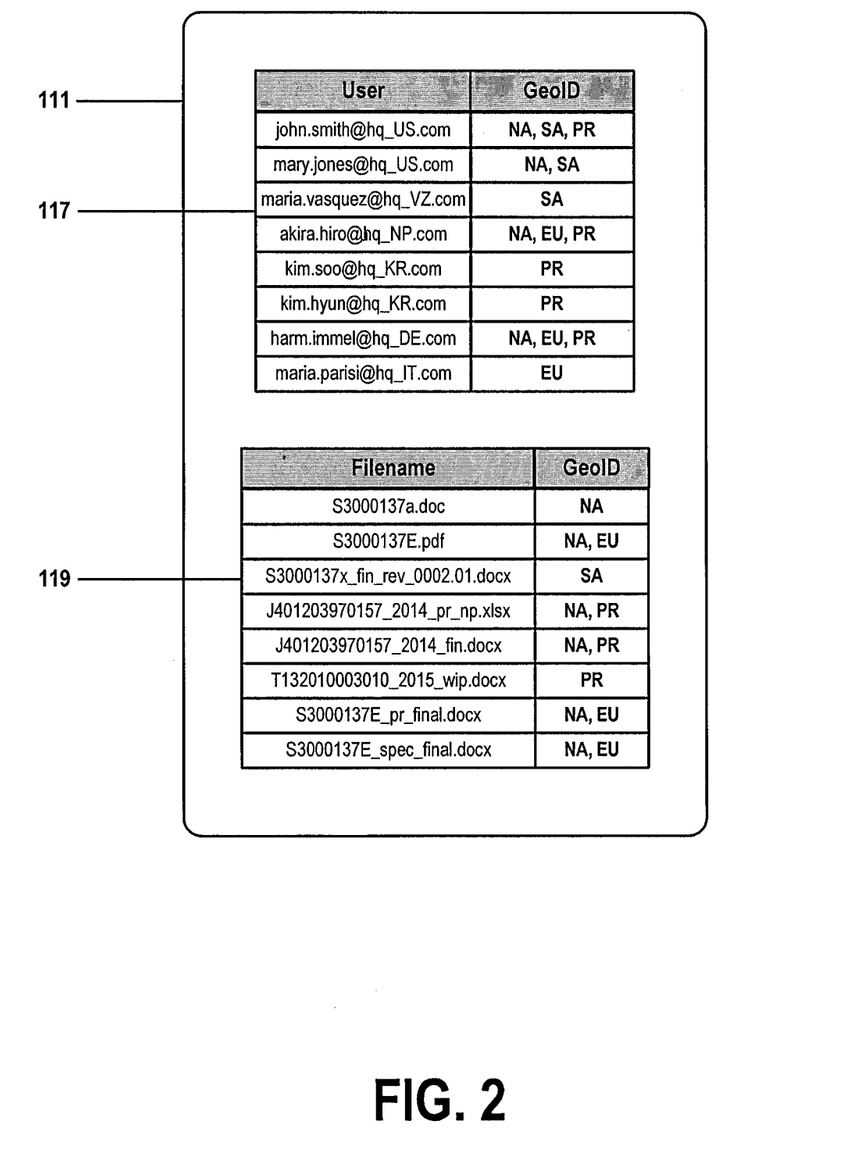
FIG. 2 illustrates the internal structures of stored data items shown in FIG. 1 according to an embodiment of the present invention.

FIG. 2 illustrates the internal structures of stored data items shown in FIG. 1 according to an embodiment of the present invention. FIG. 2 comprises reference numerals 111, 117, and 119, which are also shown in FIG. 1.

Reference numeral 111 shows one of the data storage devices identified by the reference number 111 in FIG. 1 and described in the text that accompanies FIG. 1. Storage device 111 may store one or more access-control lists 117 and one or more lists of file classifications 119.

Reference numeral 117 identifies an access-control list that corresponds to the ACL 117 in FIG. 1 and which is described in the text that accompanies FIG. 1. Some embodiments of the present invention may comprise multiple access-control lists.

In FIG. 2, access-control list 117 comprises a list of user identifiers or credentials and a set of classifications associated with each user identified by an entry in the list. In this example, each classification represents an instance of a geographic location "GeoID" category. In other examples, classifications may represent instances of a different category, such as, but not limited to: product-line identifier, customer-account identifier, network type, server-platform type, or server operating status.

In the example of FIG. 2, each user enumerated in access-control list 117 is authorized to access files that are classified by a geographic location associated with the user in ACL 117. For example, the first entry of access-control list 117 associates user credentials john.smith@hq_US.com with "NA" (North America), "SA" (South America), and "PR" (Pacific Rim) classification instances of category GeoID. Here, that entry designates that the user identified as "john.smith@hq_US.com" may access files classified by classification "NA," "SA," or "PR."

Reference numeral 119 identifies a file-classification list that enumerates a set of files and stores one or more classifications associated with each file in the set. In this example, all classifications comprised by the file-classification list belong to the GeoID category. The first entry, for example, designates that file S3000137a.doc is classified by geographic location "NA." Just as it is possible for a user listed in access-control list 117 to be authorized to access more than one classification of files, it is possible for a file in list 119 to be classified by more than one classification of a category.

Figure 3:
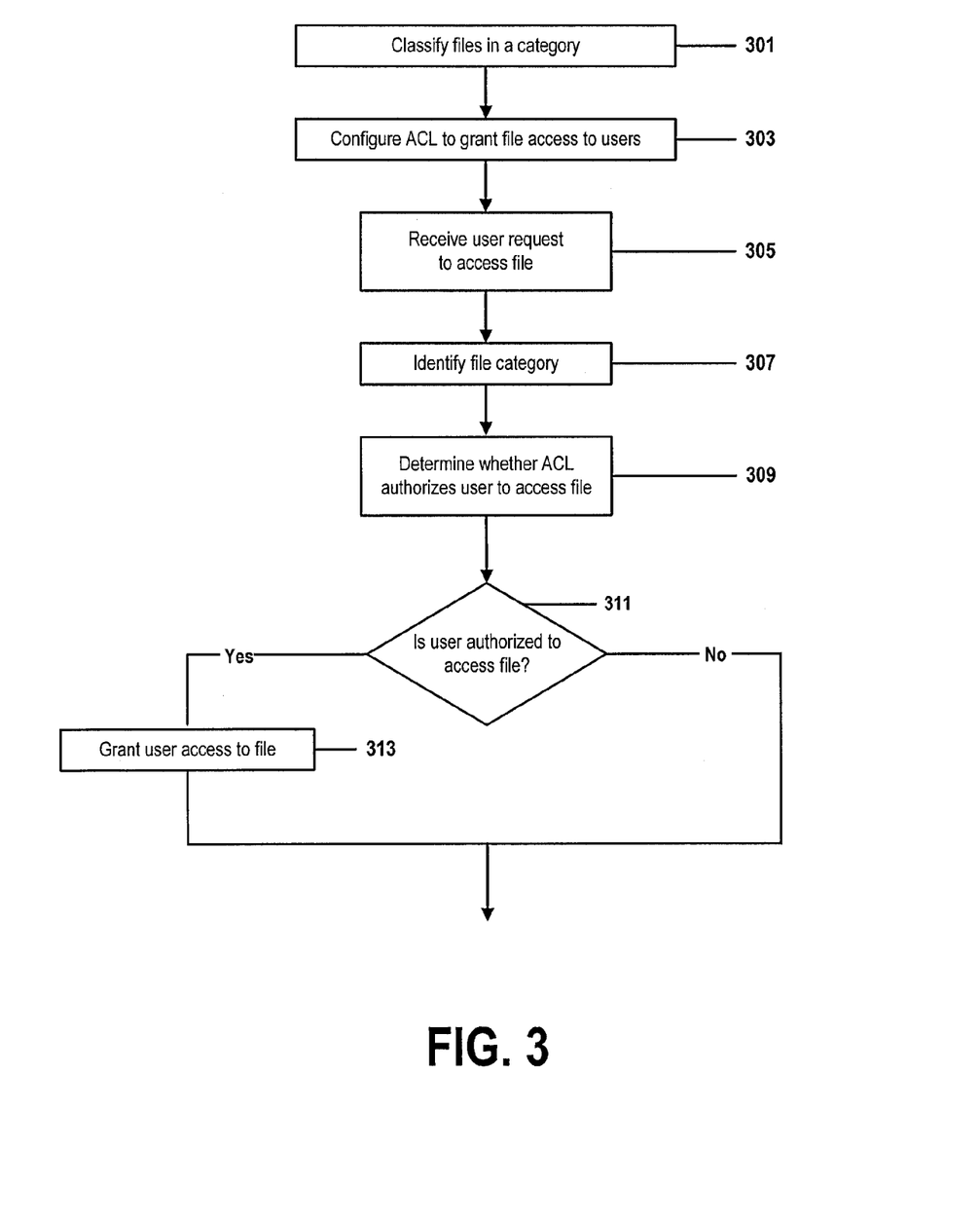
FIG. 3 is a flow chart that illustrates steps of access-control application 107 performed upon data items 117 and 119 of FIGS. 1 and 2, in accordance with embodiments of the present invention.

FIG. 3 is a flow chart that illustrates steps of access-control application 107 performed upon data items 117 and 119 of FIGS. 1 and 2, in accordance with embodiments of the present invention. FIG. 3 comprises steps 301-313.

In step 301, a processor receives classifications of a set of two or more files, where each classification comprises at least one instance of a category, and stores the classifications of the set of files in a file-classification list 119. In FIG. 2, for example, file-classification list 119 lists a file S3000137E.pdf that is classified by two instances "NA" and "EU" of category GeoID.

Here, all classifications stored in file-classification list 119 are instances of the same category. In some embodiments, a processor may classify multiple sets of files in this way, wherein each file-classification list comprises classifications of a single category, but where two file-classification lists do not necessarily comprise classifications of the same category.

In step 303, the processor receives a configuration of an access-control list (ACL) 117, wherein the ACL 117 lists a set of user identifiers and associates one or more classifications of a category to each identified user in the list. In the example of FIGS. 2 and 3, the user identified by "maria.vasquez@hq_VZ.com" is associated in ACL 117 with an "SA" ("South America") instance of category GeoID. In embodiments, this association would imply that the user identified by "maria.vasquez@hq_VZ.com" has authority to access documents classified by the "SA" instance of category GeoID. In FIG. 2, that authorization would grant this user access to file "S3000137x_fin_rev_0002.01.docx," which is classified with an instance "SA" of category GeoID in file-classification list 119.

In step 305, processor receives a request to grant a user access to one or more of the files listed in file-classification list 119. This request may come in any of a variety of forms, depending on implementation details, such as an attempt to display secured media on a mobile device, a database query made from a personal computer, or a hyperlink click by a user of an Internet browser. In all cases, the request identifies at least a requesting user and a requested file, but does not specify an associated category, wherein instances of that associated category may have classified the requested file.

In an example based on FIG. 2, a request that specifies a user identified by "john.smith@hq_US.com" and file S3000137a.doc may imply that the user identified by "john.smith@hq_US.com" has requested access to file S3000137a.doc. In some embodiments, this access may comprise authorization to read, write, delete, display, move, copy, or reformat the requested file, or may comprise a combination of secured behaviors.

Figure 4:
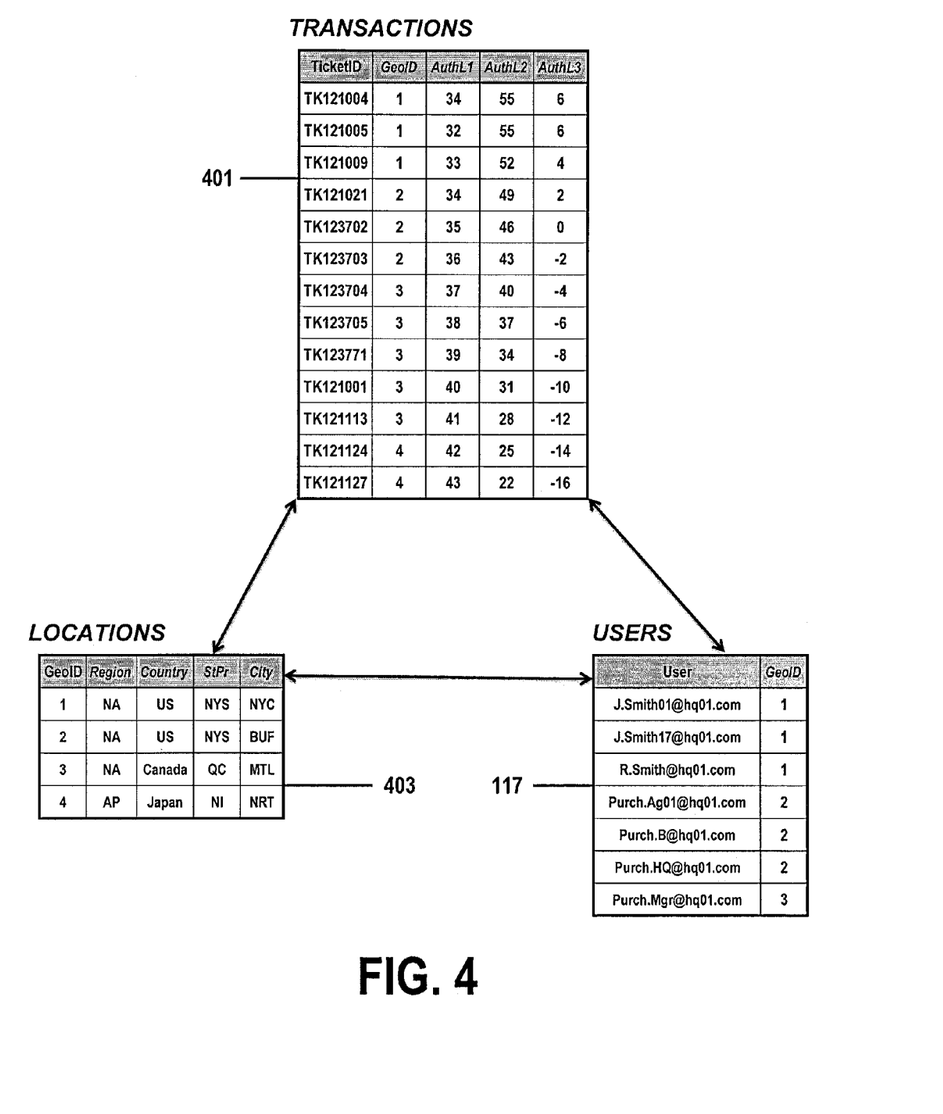
FIG. 4 illustrates the internal structure of data items that comprise a security architecture that conforms to an embodiment of the present invention.

In some embodiments, as described in FIG. 4, step 305 may comprise additional authentication and authorization steps.

Step 307 identifies the associated category based on a classification associated with the requested file in file-classification list 119. In the previous example based on FIG. 2, wherein a user request specified file S3000137a.doc, a lookup into file-classification list 119 would show that file S3000137a.doc is associated in that list 119 with an instance of category GeoID. In other embodiments, this identification function may comprise additional or different procedures.

Step 309 determines whether ACL 117 authorizes the requesting user to access the requested file. In the ongoing example based on FIG. 2, this determination would be made by comparing instances of GeoID in ACL 117 associated with requesting user "john.smith@hq_US.com" to instances of GeoID in file-classification list 119 associated with requested file S3000137a.doc.

Step 311 decides whether to grant the requesting user access to the requested file, based on the determination of step 309. If step 309 had determined that ACL 117 authorizes the requesting user to access the requested file, then the method of FIG. 3 continues with step 313. If step 309 had determined that ACL 117 does not authorize the requesting user to access the requested file, then the method of FIG. 3 terminates without granting such authorization.

In the ongoing example based on FIG. 2, the requesting user, identified by user identifier "john.smith@hq_US.com," is associated with GeoID-category classifications "NA," "SA," and "PR," thus giving the requesting user access to files that are associated in file-classification table 119 with any of those three classifications. In other embodiments, this determining procedure may comprise additional or different steps, and the types of access authorized by these steps may be more complex. Here, because file S3000137a.doc is associated with classification "NA," which is one of the three classifications associated with the user identified as "john.smith@hq_US.com," step 311 decides to grant the requesting user access to the requesting file via step 313.

In a counterexample based on FIG. 2, a second user request might specify a requesting user identified by identifier "maria.vasquez@hq_VZ.com," who is associated in ACL 117 with GeoID-category classification "SA," and might further specify requested file "S3000137a.doc," which is associated in file-classification list 119 with GeoID-category classification "NA.," In this counterexample, step 309 would have determined that the ACL 117 does not authorize requesting user to access the requested file, and step 311 would decide that step 313 should not be performed.

In other embodiments, the determination procedure of step 309 may comprise additional functions or functions different than a simple direct comparison of classifications stored in an ACL to classifications stored in a file-classification list.

In the ongoing example, step 313 grants the requesting user access to the requested file because step 309 had determined that ACL 117 authorizes the requesting user to access the requested file, as a function of the GeoID-category classifications associated with the requesting user's identifier in ACL 117 and as a further function of the GeoID-category classifications associated with the requested file in file-classification list 119. If step 309 had determined that ACL 117 does not authorize the requesting user to access the file requested, step 313 would not have been performed.

FIG. 4 illustrates the internal structure of data items that comprise a security architecture that conforms to an embodiment of the present invention. FIG. 4 comprises items 117, 401, and 403.

FIG. 4 presents one example of how embodiments of the present invention may comprise security architectures that might enhance the ACL-based method of FIGS. 2-3 with additional components, steps, logic, or stored data. These embodiments may comprise multiple access-control lists and multiple categories.

In this example, reference number 401 refers to an access-control list "TRANSACTIONS," which stores a plurality of sets of transaction data, and where each set of transaction data is associated with an instance of a transaction-identifier category "TicketID."

Each transaction in ACL TRANSACTIONS 401 may be further associated with a numerically coded instance of a geographic location category "GeoID" and with up to three authorization levels, where the instances of the three authorization levels are respectively stored as instances of variables "AuthL1," "AuthL2," and "AuthL3." In this example, an instance of GeoID and an instance of each of the three authorization levels may be stored in the TRANSACTIONS 401 ACL in a manner that associates these four data items with an instance of TicketID category. In some cases, an instance of the TicketID category may be associated with a subset of these four instances, or may be associated with a subset of the four instances through a different logical relation.

In FIG. 4, for example, the first data row of ACL TRANSACTIONS 401 comprises transaction data that associates a transaction-identifier "TK121004" with a geographic location "1," a first authorization level of "34," a second authorization level of "55," and a third authorization level of "6."

Reference number 403 identifies a second access-control list "LOCATIONS," which stores information associated with instances of the category "GeoID."

In this example, GeoID identifies a geographic location that is associated with a four-tier hierarchy of progressively narrower sublocations, and where each sublocation is identified by a subcategory data item stored in table LOCATIONS 403.

This hierarchy comprises:

GeoID>Region>Country>StPr>City, where an instance of geographic location category GeoID is associated with a global region identified by an instance of data item "Region," a country identified by an instance of data item "Country," a state, province, or national region identified by an instance of data item "StPr," and a city identified by an instance of data item "City."

In the example of FIG. 4, the first row of access-control list LOCATIONS 403 associates a GeoID instance of "1" with a global region "NA" ("North America"), a country "US," a state/province/national region "NYS" ("New York State:), and a city "NYC" ("New York City").

Reference number 117 identifies a third access-control list "USERS," which classifies UserID user identifiers with instances of category "GeoID."

In the example of FIG. 4, ACLs LOCATIONS 403 and USERS 117 are logically related by the category GeoID, which is both a category in ACL LOCATIONS 403 and associated with instances of variable UserID in table USERS 117.

An instance of UserID in table USERS 117 identifies a set of user credentials that identify an individual user or user group, where that set of user credentials is associated with an instance of geographic location GeoID.

The first data row of ACL USERS 117 in FIG. 4, for example, comprises an instance of UserID that identifies user credentials "J.Smith01@hq01.com" and associates those credentials with a geographic location identified by an instance of category GeoID that has a value of "1." Here, a GeoID value of 1 corresponds to the first set of entries of table LOCATIONS 403, which associates a GeoID value of "1" with the hierarchy "NA>US>NYS>NYC." In effect, ACL LOCATIONS 403 is one component of a security architecture that comprises a structured category GeoID, wherein this structured category comprises a set of subcategories, and wherein each set of instances of this set of subcategories is organized into a data structure.

Embodiments of the present invention may use a variety of procedures to implement security architectures based on multiple access-control lists and may store one or more of these access-control lists in any type of information repository known to those skilled in the art of software design. Such information repositories may include, but are not limited to, one or more relational databases, a Hadoop distributed file system, Extensible Markup Language ("XML") code, Java code, Visual Basic code, or combinations thereof.

In some embodiments, the data structure of FIG. 4 may be extended to comprise an arbitrary number of access-control lists, and those access-control lists may be linked by one or more common categories or subcategories in complex ways. In some embodiments, an access-control list may combines instances of more than one type of category, and may combine instances of structured categories that each comprise subcategories, as illustrated in ACL LOCATIONS 403.

In some embodiments, such a security architecture may comprise a multi-step security procedure that employs multiple categorized ACLs to provide additional levels of security. Such a multi-step method might, for example, comprise the steps of: retrieving and authenticating a set of user credentials associated with a requesting user by locating and retrieving those credentials from a first ACL and then using those authenticated user credentials to retrieve an authorization code stored in a second ACL, wherein one or both retrievals may be functions of a category of a requested file; and then using that authorization code to retrieve a final access-control list that determines whether the requesting user is authorized to retrieve files classified by the category of the requested file.

Other embodiments might comprise, but are not limited to, methods wherein a category or a subset of a category's set of subcategories, are related in ways that allow a plurality of access-control lists to be linked together to provide multilevel security authentication, authorization, and access-control procedures, or to provide redundant security authentication, authorization, and access-control procedures, or to allow steps that relate subcategories of different variables in order to control access to files. In other embodiments, such steps and procedures may be combined to control access to files that are associated with classifications from different or multiple categories.

Although these examples may span a broad range of implementations, all these embodiments, and other embodiments of the present invention not expressly described herein, comprise methods to control access to computer files that are based on the use of an access-control list in conjunction with the classification of those files within a category.

While embodiments of the present invention have been described herein for purposes of illustration, many modifications and changes will become apparent to those skilled in the art. Steps of the methods described herein may be performed in different order or may vary in minor ways. Accordingly, the appended claims are intended to encompass all such modifications and changes as fall within the true spirit and scope of this invention.

What is claimed is:

1. A computer system for controlling access to files, the computer system comprising:
 a processor;
 a computer-readable memory;
 a computer-readable storage device;
 first program instructions for receiving classifications of two or more files into a same category and storing the classifications of the two or more files, wherein the category comprises one of: product-line identifier, geographic location, customer-account identifier, network type, server-platform type, and server operating status;
 second program instructions for receiving a configuration of an access-control list to grant access to one or more users to the two or more files based on the category;
 third program instructions for, in response to a request for access by a user for one file of the two or more files, the request specifying the one file but not the category of the one file, identifying, by one or more processors, the category of the one file based on the stored classification of the one file, and checking the access-control list to determine that the user is authorized to access the category, and, in response, granting, by the one or more processors, the user access to the one file, and
 fourth program instructions for storing the access-control list in an information repository,
  wherein the information repository comprises a security architecture,
  wherein the security architecture controls access to a secured system,
  wherein the security architecture comprises a category variable, and
  wherein the category variable comprises a set of category sub-variables; and
  wherein the identifying comprises:
   requesting and receiving a set of user credentials, wherein the set of user credentials is associated with the user;
   communicating a first query to the information repository, wherein the first query is a function of the set of user credentials;
   receiving an authorization code from the information repository in response to the first query, wherein the authorization code is a function of the user credentials, and wherein the authorization code confirms that the user is an authenticated user of the secured system;
   communicating a second query to the information repository, wherein the second query is a function of the authorization code;
   receiving the access-control list from the information repository in response to the second query, wherein the receiving is a function of the authorization code; and
   retrieving the category from the access-control list; and
  wherein the first program instructions, the second program instructions, and the third program instructions, and the fourth program instructions are stored on the computer-readable storage device for execution by the processor via the computer-readable memory.

2. The computer system of claim 1, wherein the same category comprises one of: product-line identifier, geographic location, and customer-account identifier.

3. The computer system of claim 1, wherein the same category comprises one of: network type, server-platform type, and server operating status.

4. The computer system of claim 1, wherein the information repository comprises one of: a data warehouse, a database, and a file system.

5. A method for controlling access to files, the method comprising:
 one or more processors of a computer system receiving classifications of two or more files into a same category and storing the classifications of the two or more files, wherein the category comprises one of: product-line identifier, geographic location, customer-account identifier, network type, server-platform type, and server operating status;

the one or more processors further receiving a configuration of an access-control list to grant access to one or more users to the two or more files based on the category;

the one or more processors, in response to a request for access by a user for one file of the two or more files, the request specifying the one file but not the category of the one file, identifying, by the one or more processors, the category of the one file based on the stored classification of the one file, and checking the access-control list to determine that the user is authorized to access the category, and, in response, granting, by the one or more processors, the user access to the one file, and the one or more processors storing the access-control list in an information repository, wherein the information repository comprises a security architecture, wherein the security architecture controls access to a secured system, wherein the security architecture comprises a category variable, and wherein the category variable comprises a set of category sub-variables; and wherein the identifying comprises:

requesting and receiving a set of user credentials, wherein the set of user credentials is associated with the user;

communicating a first query to the information repository, wherein the first query is a function of the set of user credentials;

receiving an authorization code from the information repository in response to the first query, wherein the authorization code is a function of the user credentials, and wherein the authorization code confirms that the user is an authenticated user of the secured system;

communicating a second query to the information repository, wherein the second query is a function of the authorization code;

receiving the access-control list from the information repository in response to the second query, wherein the receiving is a function of the authorization code; and retrieving the category from the access-control list.

6. The method of claim 5, wherein the same category comprises one of: product-line identifier, geographic location, and customer-account identifier.

7. The method of claim 5, wherein the same category comprises one of: network type, server-platform type, and server operating status.

8. The method of claim 5, wherein the information repository comprises one of: a data warehouse, a database, and a file system.

9. A computer program product, comprising a computer-readable hardware storage device having a computer-readable program code stored therein, said program code configured to be executed by one or more processors of a computer system to implement a method for controlling access to files, the method comprising:

the one or more processors receiving classifications of two or more files into a same category and storing the classifications of the two or more files, wherein the category comprises one of: product-line identifier, geographic location, customer-account identifier, network type, server-platform type, and server operating status;

the one or more processors further receiving a configuration of an access-control list to grant access to one or more users to the two or more files based on the category;

the one or more processors, in response to a request for access by a user for one file of the two or more files, the request specifying the one file but not the category of the one file, identifying, by the one or more processors, the category of the one file based on the stored classification of the one file, and checking the access-control list to determine that the user is authorized to access the category, and, in response, granting, by the one or more processors, the user access to the one file, and the one or more processors storing the access-control list in an information repository, wherein the information repository comprises a security architecture, wherein the security architecture controls access to a secured system, wherein the security architecture comprises a category variable, and wherein the category variable comprises a set of category sub-variables; and wherein the identifying comprises:

requesting and receiving a set of user credentials, wherein the set of user credentials is associated with the user;

communicating a first query to the information repository, wherein the first query is a function of the set of user credentials;

receiving an authorization code from the information repository in response to the first query, wherein the authorization code is a function of the user credentials, and wherein the authorization code confirms that the user is an authenticated user of the secured system;

communicating a second query to the information repository, wherein the second query is a function of the authorization code;

receiving the access-control list from the information repository in response to the second query, wherein the receiving is a function of the authorization code; and retrieving the category from the access-control list.

10. The computer program product of claim 9, wherein the same category comprises one of: product-line identifier, geographic location, and customer-account identifier.

11. The computer program product of claim 9, wherein the same category comprises one of: network type, server-platform type, and server operating status.

12. The computer program product of claim 9, wherein the information repository comprises one of: a data warehouse, a database, and a file system.

\* \* \* \* \*